United States Patent

[11] 3,582,599

| [72] | Inventor | Melvin G. Yohn<br>Canton, Ohio |
|---|---|---|
| [21] | Appl. No. | 748,311 |
| [22] | Filed | July 29, 1968 |
| [45] | Patented | June 1, 1971 |
| [73] | Assignee | McKenzie-Ris Mfg. Corp.<br>Missillon, Ohio |

[54] INTERNAL WELDING TOOL
8 Claims, 14 Drawing Figs.

[52] U.S. Cl. ................................................ 219/60,
219/130
[51] Int. Cl. ................................................ B23k 9/02
[50] Field of Search ........................................ 219/59, 60,
60.1, 130, 61, 65, 66, 124—6; 228/33, 45

[56] References Cited
UNITED STATES PATENTS

| 2,444,834 | 7/1948 | Landis et al. | 219/73 |
| 3,209,119 | 9/1965 | Keidel et al. | 219/73X |
| 2,260,260 | 10/1941 | Mikesh | 219/60 |
| 2,289,938 | 7/1942 | Smith | 219/136 |
| 2,786,933 | 3/1959 | Hume | 219/60 |
| 2,881,305 | 4/1959 | Wociak et al. | 219/130 |
| 3,009,048 | 11/1961 | Stanley | 219/60 |
| 3,060,307 | 10/1962 | Amoldy | 219/130 |
| 3,424,887 | 1/1969 | Fehlman | 219/60 |

*Primary Examiner*—J. V. Truhe
*Assistant Examiner*—L. A. Schutzman
*Attorney*—Frease & Bishop ABSTRACT: A welding head construction for use with typical traveling head automatic welding equipment to form submerged or shielded arc welds internally in confined spaces too small to receive the usual welding head of the equipment and where the welding operation and its progress cannot be observed visually. The internal welding head is provided with forming rolls which impart a curve to the weld wire or rod fed to the submerged weld-arc location. The internal welding head in order to enter a confined space extends parallel with and very close to the weld to be formed, and the weld rod and shielding material feed means likewise extend parallel to the weld to be formed. The curved forming of the weld rod enables the weld rod to be fed to the weld-arc location substantially perpendicularly.

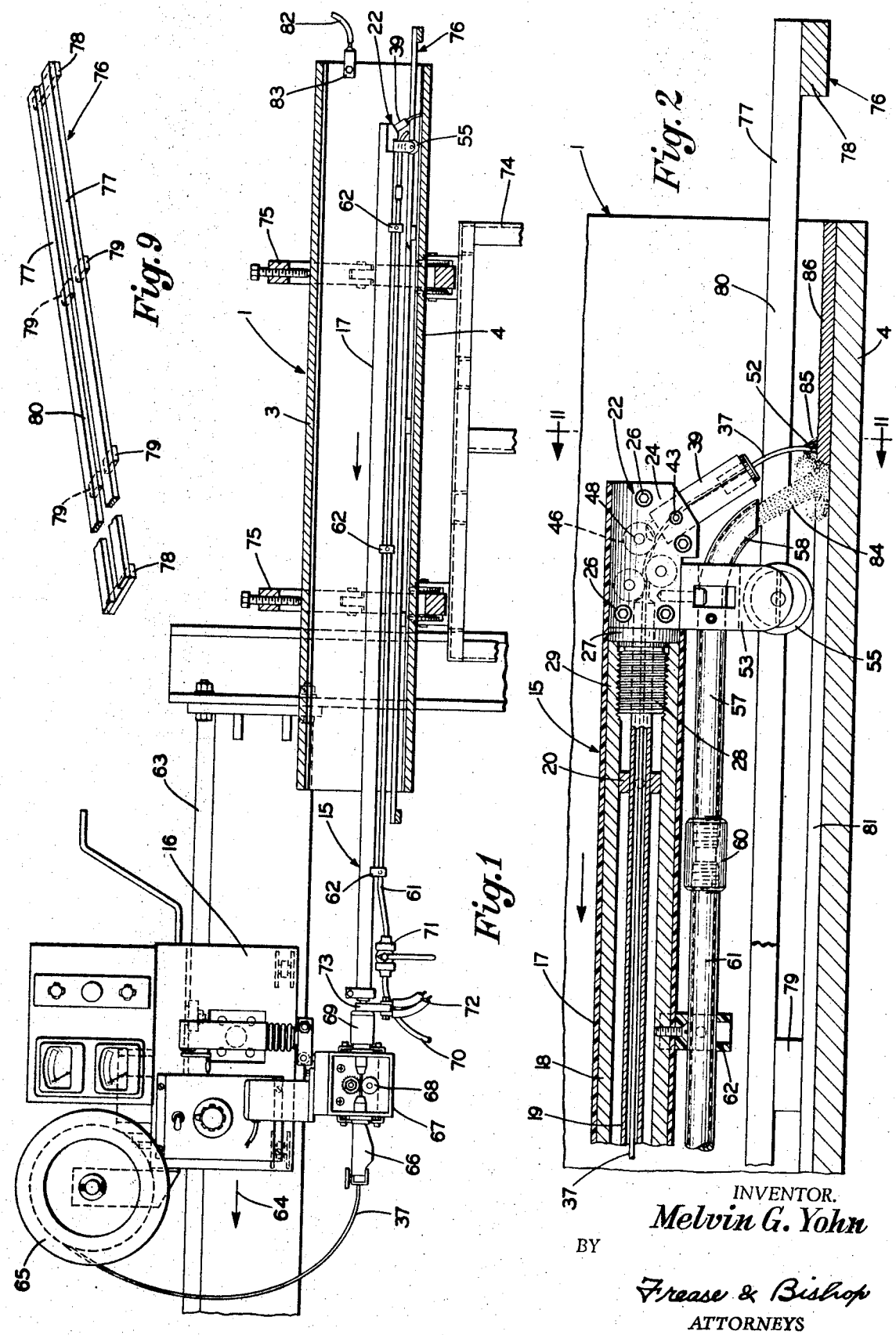

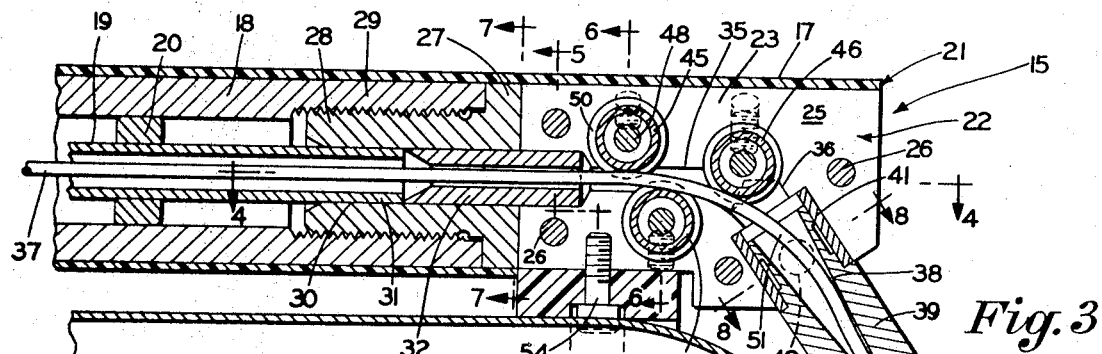
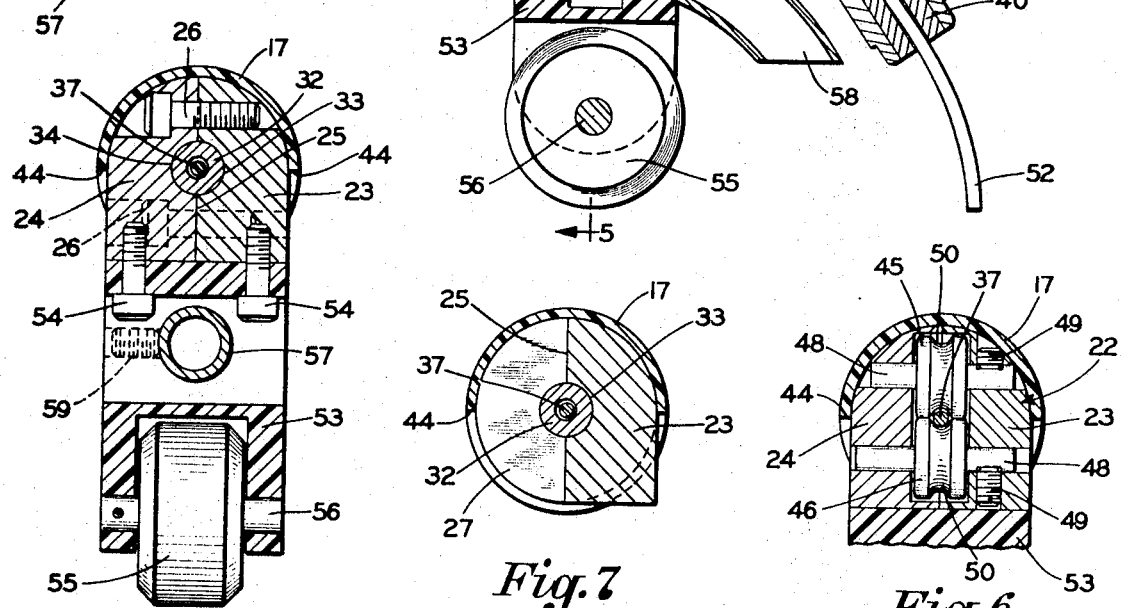
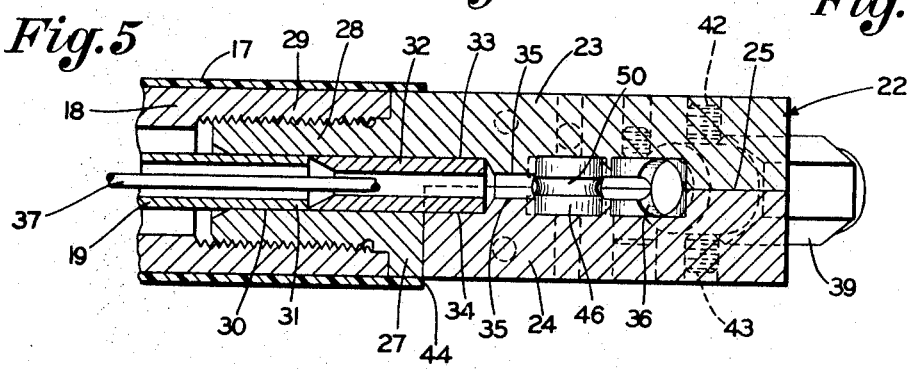
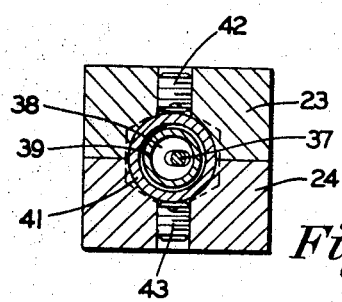

PATENTED JUN 1 1971 3,582,599

INVENTOR.
Melvin G. Yohn

BY

Froase & Bishop
ATTORNEYS

INTERNAL WELDING TOOL

BACKGROUND OF THE INVENTION

1. Field of the Invention

The invention relates to traveling head automatic welding equipment used to form submerged or shielded arc welds. Such equipment typically has a movable welding head or carriage on which a contact nozzle assembly is mounted, with the nozzle extending at right angles to the weld being formed during movement of the carriage along the line defining the location of the weld being formed. A weld rod is fed through the nozzle perpendicularly to the weld being formed, and flux material is fed through the nozzle around the weld rod as the latter is being fed to the weld-arc.

The manufacture of headers for heat exchangers from C-shaped heavy plate material header sections to provide a rectangular header cross section without welds at the formed header corners, with a finished header length of say from 5 to 12 feet, for example, with internal header dimensions of say 6 inches×9 inches, and with double-butt-weld seams between the formed C-shaped header sections involves the formation of inside seam welds. There is not room within such a header in which to locate and move the typical traveling welding head or carriage of automatic welding equipment in order to form such an inside shielded arc seam weld.

2. Description of the Prior Art

There has been no known equipment or procedures for making a double-butt-weld seam in the manufacture of heat exchanger header equipment of the character described. Attempts to form an inside seam of a double-butt-weld seam in the confined space existing in headers from 5 to 12 feet long have involved manual manipulation of a welding tool with a welding head mounted on the end of a pole. It is impossible to form a sound and uniform weld with such manual manipulation.

Other attempts have been made to form sound welds using a traveling welding head projected into a confined interior header space, with the traveling head provided with means through which a weld rod and flux material is fed to the location of the weld-arc. However, difficulties have been encountered in properly delivering the weld rod and flux to the weld-arc where the submerged or shielded arc welding operation is taking place, with the weld rod oriented so that a uniform weld may be formed progressively within the confined space where observation of the welding operation and its progress is not possible.

SUMMARY OF THE INVENTION

Objectives of the invention include providing a special wandlike internal welding tool which may be attached to a modified head or carriage of typical automatic welding equipment, in which the wand has a connector end and a free end with welding head means at its free end provided with means for reforming a weld rod delivered from the free end of the wand to arrive at the weld area substantially perpendicularly to the weld to be formed; preferably providing removable track means adapted to be inserted within the confined interior of an elongated tubular member to be internally welded, which track means guides the free end of the wand as it is moved longitudinally to form a shielded arc weld within the tubular member being internally welded; and providing an internal welding tool construction eliminating difficulties heretofore encountered, achieving the stated objectives simply and effectively, and solving problems and satisfying exiting needs.

These objectives and advantages are obtained by the internal welding tool construction, the general nature of which may be stated as including a generally tubular wandlike assembly having a connector end and a free end and preferably having a length somewhat greater than the length of a tubular member to be internally welded with a longitudinally extending shielded arc weld; said wand member having a weld rod delivery tube extending therethrough for conveying a weld rod from the coupling and free ends of the wand; means for connecting the coupling end of said wand and its flux supply means and weld rod delivery tube to the traveling welding carriage of automatic welding equipment; roll support and guide means mounted at the free end of said wand; forming roll means mounted at the free end of said wand adapted to convey and impart curvature to a weld rod passing through said wand and to deliver the weld rod in curved form from the free end of the wand; preferably removable tracklike wand guide means adapted to be inserted within a tubular member to be internally welded; said track and roll support means cooperating to guide the free end of said wand as the wand is moved longitudinally of the tubular member being welded with a submerged arc weld; and means for supplying arc welding potential to the weld rod and tubular member or workpiece being welded.

BRIEF DESCRIPTION OF THE DRAWINGS

Preferred embodiments of the invention—illustrative of the best mode in which applicant has contemplated applying the principles—are set forth in the following description and shown in the drawings and which are particularly and distinctly pointed out and set forth in the appended claims.

FIG. 1 is a diagrammatic side elevation, with certain parts shown in section, illustrating the new internal welding tool construction attached to typical automatic welding equipment modified for receiving the improved construction, and showing the improved tool carrying out a submerged arc welding operation internally of a workpiece;

FIG. 2 is an enlarged view of a fragmentary portion of FIG. 1;

FIG. 3 is a further enlarged fragmentary sectional view of the free or welding head end of the improved welding tool;

FIG. 4 is a plan sectional view taken on the line 4–4 of FIG. 3;

FIG. 5 is a cross-sectional view taken on the line 5–5, FIG. 3;

FIG. 6 is another cross-sectional view taken on the line 6–6 of FIG. 3;

FIG. 7 is a section looking in the direction of the arrows 7–7 of FIG. 3;

FIG. 8 is a sectional view looking in the direction of the arrows 8–8, FIG. 3;

FIG. 9 is a perspective view of removable track guide means which may be used to guide the improved internal welding tool;

Similar numerals refer to similar parts throughout the various figures of the drawings.

DESCRIPTION OF THE PREFERRED EMBODIMENT

Figure 10:
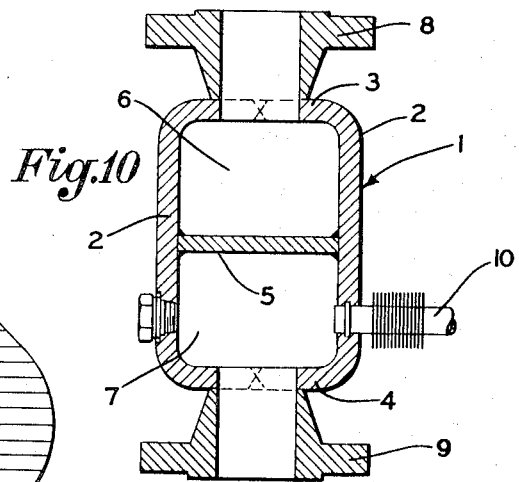
FIG. 10 is a cross-sectional view through a typical heat exchanger header which may be fabricated using the improved internal welding tool.

A heat exhanger header is illustrated generally at 1 in FIG. 10 including heavy plate metal sidewalls 2, top and bottom walls 3 and 4 and partition wall 5 dividing the header into separate passages or passes 6 and 7. Passage 6 may be connected externally to any desired member by flange 8 and passage 7 may be connected to an external member by a flange 9. Passage 7 also may have a heat exchanger tube 10 communicating therewith.

Figure 11:
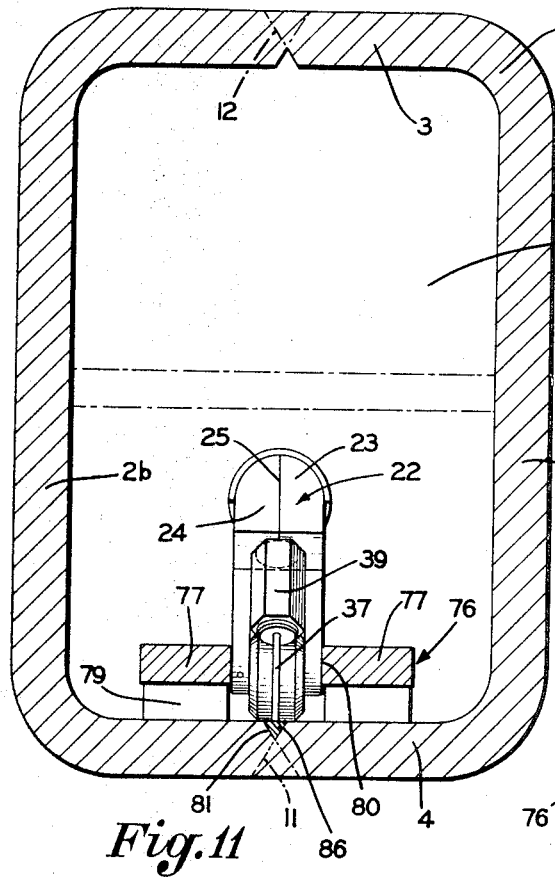
FIG. 11 is an enlarged view of a portion of the header shown in FIG. 10 illustrating the improved tool used to form an internal weld looking in the direction of the arrows 11–11, FIG. 2.

Header 1 may have an internal dimension defined by walls 2, 3 and 4 of say 9×6 inches, for example, and may have a length, for example, of say 5 to 12 feet. A header 1 preferably is fabricated using a C-shaped header section formed of right-hand sidewall 2 and top and bottom wall portions 3 and 4 (FIGS. 10 and 11). Such right-hand C-shaped member is indicated at 2a in FIG. 11. A similar left-hand C-shaped member 2b (FIG. 11) is composed of left-hand sidewall 2 and top and bottom wall portions 3 and 4 (FIG. 10).

The header sections 2a and 2b may be assembled together and provided with an outer seam weld indicated by dot-dash lines 11 in the bottom wall 4 and a similar outer seam weld indicated by dot-dash lines 12 in the top wall 3. It is desired in the construction of heat exchanger headers of the character described, that an internal seam weld opposite the outer welds 11 and 12 be provided to form double-butt-weld seams in each of the top and bottom header walls 3 and 4.

In this manner, the header 1 may be formed with strong rounded corners 13 in the heavy plate metal header walls. This avoids the formation of welds at the header corners in fabricating a header from heavy plate metal. Also the number of double-butt-weld seams is reduced to two by locating them in the top and bottom walls between corners, since four would be required if located at each of the corners 13 of the header.

Difficulties have been encountered in the past in forming internal welds, internally opposite outer seam welds 11 and 12 because the space or cavity, indicated at 14 in FIG. 11, extending through the interior of the header 1 is confined and not large enough to accommodate the usual head and carriage of automatic welding equipment. On the other hand, a shielded arc weld is the type of weld desired in making double-butt-weld seams in the manufacture of headers of the character described and illustrated, and it is desirable to use automatic welding equipment to form shielded arc weld.

In accordance with the invention, a new internal welding tool generally indicated at 15 is provided which may be mounted on and operated by the usual carriage 16 of automatic welding equipment, modified in certain respects to permit the attachment of the improved welding tool 15.

Tool 15 preferably includes an elongated wandlike member 17 formed of electrical insulation material, within which a tubular support member 18 is telescoped. Member 18 preferably is formed of aluminum. A weld rod delivery tube 19 is supported by spacer members 20 within support tube 18, and tube 19 may be formed of stainless steel tubing.

The wandlike insulation member 17 has a free or open end generally indicated at 21 within which a preferably copper electrode nozzle head assembly generally indicated at 22 is located. Nozzle head 22 is formed essentially of two members 23 and 24 (FIG. 4) which are split along a vertical plane indicated at 25 in FIGS. 4, 5 and 7 and are assembled together by screws 26. Nozzle head member 23 preferably is formed with a flangelike portion 27 and a rearwardly extended threaded shank 28 which is threaded into the forward or nozzle head end 29 of tubular support member 18. Threaded shank 28 is formed with a central tubular opening 30 receiving the nozzle end 31 of weld rod delivery tube 19. A wear bushing 32 also is received in the bore 30 of shank 28 and member 32 projects forwardly to a location in cavities formed in mating portions of members 23 and 24 as shown in FIGS. 3 and 4.

The flat vertical surfaces along the division plane 25 between members 23 and 24 are formed with half-round recesses or cavities 33 and 34, half in each nozzle head member, to receive the forward end of wear bushing 32. Members 23 and 24 also are formed with matching passage forming cavities, grooves or channels 35, enlarged at 36 through which a weld rod or wire 37 passes when delivered to nozzle head 22 through delivery tube 19 and wear bushing 32. Weld rod 37 then moves into and through enlarged throat 38 of nozzle tip 39. Tip 39 has a wear bushing 40 and a mounting bushing 41, and bushing 41 and tip 39 are clamped between members 23 and 24 and held in position by setscrews 42 and 43 (FIG. 8).

The lower portion of the open free end 21 of member 17 is cut away at 44 (FIGS. 5, 6 and 7) back to the flangelike portion 27 (FIG. 4) of member 23 to permit the nozzle tip 39 to project downwardly forwardly at an angle from the free end of the tool, as shown in FIG. 3.

A cluster of three rolls 45, 46 and 47 is mounted within nozzle head 22. Each of rolls 45, 46 and 47 is journaled on a lateral roll shaft 48 mounted in the split nozzle head members 23 and 24 and shafts 48 are held in position by a set screw such as setscrews 49 illustrated in FIG. 6 carried by member 23. Rolls 45, 46 and 47 each are formed with substantially half-round grooves 50 which align with passages 35—36 formed in nozzle head 22. Rolls 45, 46 and 47 act as forming rolls so located with respect to the passage through wear bushing 32 that a weld rod 37 moving forwardly, or to the right in FIG. 3, out of bushing 32 is reformed to a downwardly curved shape indicated at 51 in FIG. 3. The enlarged throat of nozzle tip 39 permits curved weld rod to retain the curved shape imparted to it. Thus, as weld rod curved portion 51 emerges from nozzle tip wear bushing 40, it curves further downwardly as indicated at 52, so as to be substantially vertical, as shown, or perpendicular to its previous horizontal line of movement through delivery tube 19 (FIGS. 1 and 3).

An insulated guide bracket 53, preferably formed of nylon, is mounted by capscrews 54 on nozzle head 22 (FIGS. 3 and 5) and a guide roll 55 is journaled at 56 in the lower end of bracket 53. A flux supply tube 57 extends along wand member 17 and has a downwardly curved end 58 located below nozzle tip 39. The free end portion of flux supply tube 57 passes through and is secured by a setscrew 59 to guide bracket 53. Tube 57 may be coupled at 60 (FIG. 2) with a similar tube 61 carried by insulating bracket clamps 62 on wand and support member tubes 17—18, three of such clamps being shown in FIG. 1.

Usual control devices, feed motors, etc., are mounted on carriage 16 of typical automatic welding equipment. Carriage 16 moves along a track or support 63 to the right or left in the usual manner as indicated by the arrow 64 in FIG. 1. A usual coil or reel 65 of weld rod material 37 is supported on carriage 16. The welding equipment is modified to provide a weld rod guide or straightener 66 mounted on weld rod drive roll housing 67 for drive rolls 68, which deliver weld rod 37 to a connector member 69 to which weld rod delivery tube 19 is connected.

The usual flux hopper, not shown, containing flux material carried by the welding equipment carriage is connected by a flexible conduit 70 through a valve 71 with flux supply pipe 61. Electrical conductors 72 are connected at 73 with the improved internal welding tool tubular support member 18 and weld rod delivery tube 19, which thus comprise one side of a DC power supply circuit for the welding tool. Thus, the tubular metal members of the tool 15 all have one potential of the power supply so as to impart that potential to the weld rod delivered as an electrode from nozzle tip 39 to the weld-arc area. The tubular insulating material wand 17 and the nylon insulating bracket 53 insulate the metal members from other parts having a different potential. The internal welding tool 15, thus mounted on usual automatic welding equipment may be moved back and forth or to the right and left viewing FIG. 1 with movement of the welding equipment carriage 16.

OPERATION AND USE OF INTERNAL WELDING TOOL

A header 1 to be internally welded is placed on a table or support 74 adjacent the welding equipment 16. Header 1 preferably is clamped in position by split ring clamps 75 carried by table 74 so that the bottom wall 4 of header 1 extends horizontally. A guide track assembly generally indicated at 76 is inserted inside header 1 and rests on bottom wall 4 (FIGS. 1, 2 and 11). Guide track 76 preferably comprises a pair of spaced strip members 77 connected together at their ends by pads 78 and having support feet 79 at intervals along their length. Guide track 76 thus forms a slot 80 within which nylon guide roll bracket 53 may be received and along which it may move, with roll 55 rolling on the inside bottom surfaces of bottom wall 4 of header 1 straddling the groove 81 wherein an inner seam weld is to be formed (FIGS. 2 and 11). A conductor 82 connected with the other terminal of a source of DC power is connected to the header 1 preferably by a contact 83.

The automatic welding equipment is moved to project the wandlike tool 15 into header 1 so that nozzle tip 39 is at the extreme right-hand end of the header (FIGS. 1 and 2). An arc is struck, and the automatic welding equipment controls place the carriage in operation to move at the desired rate, and to deliver flux 84 to the area being welded to form a shielded arc weld, the arc being diagrammatically indicated at 85 in FIG. 2. The curved end 52 of the weld rod 37 thus is presented substantially perpendicular to the weld area, as the weld rod is fed to the arc, whereby a uniform arc weld seam is formed internally of header 1 as indicated at 86 in FIGS. 2 and 11 during internal welding tool movement to the left through header 1.

Throughout the welding operation, uniform conditions are maintained in forming the internal weld 86. The usual automatic welding equipment moves at the desired rate during welding. The weld rod 37 is delivered to the arc perpendicular to the seam being formed at the seam location where flux is discharged to form a submerged or shielded arc weld. The nozzle tip 39, though located at the extreme end of a long wandlike member, is guided accurately by guide track 76 along the line of the weld to be formed. The nozzle tip 39 is maintained uniformly at the proper distance above the weld 86 being formed, by being supported immediately adjacent nozzle tip 39 on roller 55 rolling on the surfaces of the members being welded.

Thus, the improved internal welding tool 15 enables an internal seam weld to be formed by shielded arc welding procedures with usual automatic welding equipment, with the resultant weld having the same characteristics and uniformity as an exterior seam weld which may be made by the automatic welding equipment.

Figure 14:
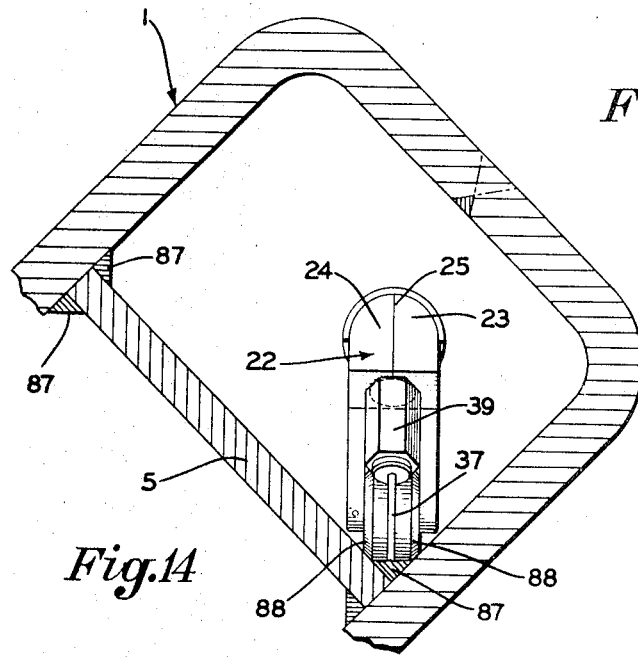
FIG. 14 is a view similar to a portion of FIG. 11 illustrating the improved tool to be used to form an internal fillet weld in a confined space.

The improved welding tool 15 also may be used as illustrated in FIG. 14 to form fillet welds 87 within header 1 for a partition 5 located within and being welded to the header. This operation is performed by positioning header 1 in clamps 75 rotated so that a header wall and a partition between which a fillet weld 87 is to be formed, each are oriented at 45° with respect to the horizontal as shown in FIG. 14. Guide track 77 is not used in performing this welding operation. Initially, partition 5 is tack welded in place and then in use of tool 15 the beveled corners 88 on guide roll 55 beveled at 45° as shown to match the 45° oriented surfaces of the header and partition walls, as shown, to accurately guide nozzle tip 39 along the fillet weld line.

DESCRIPTION OF SECOND EMBODIMENT

Figure 12:
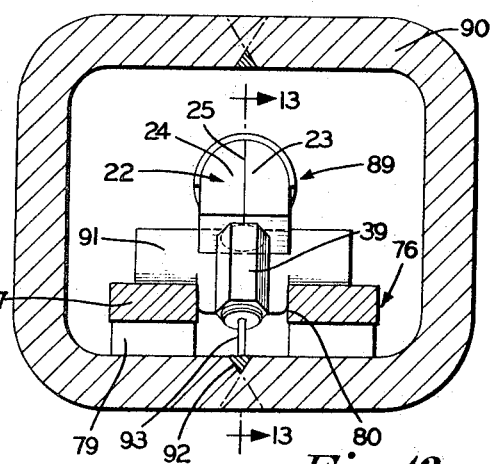
FIG. 12 is a diagrammatic view similar to FIG. 11 showing the tool of FIGS. 1 to 11 modified and used in a smaller confined space to form an internal weld.
Figure 13:
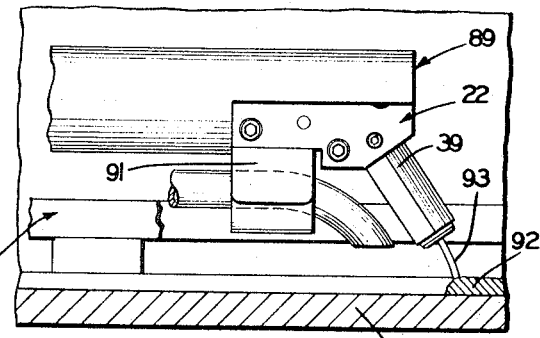
FIG. 13 is a section looking in the direction of the arrows 13–13, FIG. 12.

FIGS. 12 and 13 illustrate a slight modification of the internal welding tool indicated at 89, for use in forming an internal seam weld within a tubular member 90 in which the space available for the welding tool is considerably less than illustrated in FIG. 11.

Welding tool 89 is identical with tool 15 except that the bracket 53 and roll 55 is removed and a small nylon saddlelike bracket 91 is attached to the nozzle head 22. Bracket 91 slides on guide track 76 in forming an internal seam weld 92 as shown in FIGS. 12 and 13.

The welding conditions (FIGS. 12 and 13) are the same as those existing when using welding tool 15, except that the delivered end 93 of the weld rod does not have room enough to be presented exactly in a vertical position with respect to the weld being formed. However, its position approaches vertical, as shown in FIG. 13, so that a satisfactory weld may be formed internally within a small tubular member wherein it would be impossible otherwise to form a satisfactory internal seam weld.

The improved tool is very simple in construction and provides an effective and sturdy internal welding tool which may be used to form submerged or shielded arc welds internally in confined spaces too small to receive the usual head of typical traveling head automatic welding equipment; provides an internal welding tool which delivers the weld rod, fed initially parallel to the line of weld, substantially perpendicularly to the line of weld; provides an internal welding tool which may be guided to accurately form a uniform internal seam or fillet weld; and provides a structure which eliminates difficulties encountered with prior devices, achieves the objectives indicated, and solves existing problems in the art.

In the foregoing description, certain terms have been used for brevity, clearness and understanding; but not unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details, or to the particular type of workpiece being welded.

Having now described the features, discoveries and principles of the invention, the manner in which the improved internal welding tool is constructed and used, the characteristics of the new construction, and the advantageous, new and useful results obtained; the new and useful structures, devices, elements, arrangements, parts and combinations, and mechanical equivalents obvious to those skilled in the art are set forth in the appended claims.

I claim:

1. An internal welding tool for use on automatic welding equipment, including elongated generally tubular wand means having a connector end and a nozzle head end; the wand means including a current-conductive weld rod delivery tube member extending between the connector and nozzle head ends of said wand means, insulation means surrounding the delivery tube member, and flux supply means assembled to the delivery tube member; coupling means at the wand connector end for connecting the flux supply means and weld rod delivery tube to a traveling carriage of automatic welding equipment; split member electrode nozzle head means mounted at the nozzle head end on the wand means, said nozzle head means being connected to said delivery tube member; support and guide means mounted on the nozzle head means; shaft journaled forming roll means mounted within the nozzle head means and communicating with said delivery tube for imparting a bend to a weld rod moved and delivered to said roll means through said delivery tube; and a nozzle tip having and enlarged throat mounted on said nozzle head and projecting at an angle substantially differing from 90° with respect to said delivery tube from said nozzle head, said forming roll means importing sufficient bend to said weld rod that its angular disposition upon exiting from said nozzle tip is substantially vertical with respect to said tubular wand means, whereby a weld rod reformed to curved shape by said forming roll means is delivered through said nozzle tip to the weld area of an arc weld to be formed.

2. The construction defined in claim 1 in which the wand means includes a tubular current-conductive support member in which the delivery tube member is telescoped and mounted, in which the insulation means surrounds the support member, in which the flux supply means is carried by the support member, and in which the nozzle head means and contained roll means are mounted on and connected to the support member.

3. The construction defined in claim 1 in which the nozzle head means includes a tubular shank into which the nozzle head end of the delivery tube member extends, in which a wear bushing is mounted in said tubular shank adjacent the nozzle head end of said delivery tube member, in which the nozzle head is formed with a cavitylike passageway extending between said wear bushing and the angularly arranged nozzle tip, and in which said forming roll means are journaled on lateral shafts mounted within the nozzle head means along said passageway.

4. The construction defined in claim 3 in which said forming roll means comprises a series of grooved rollers having their grooves aligned with the passageway in said nozzle head.

5. The construction defined in claim 1 in which the support and guide means includes an insulation material bracket through which the flux supply means passes.

6. The construction defined in claim 1 in which the support and guide means includes an insulation material bracket, and a roll mounted on said bracket.

7. The construction defined in claim 6 in which said bracket-mounted roll has edges beveled at 45°, whereby a fillet weld may be formed between wall surfaces oriented at 45° with respect to the horizontal by guiding the tool with the beveled roll edges engaged with the 45° oriented surfaces.

8. The construction defined in claim 6 including guide track means removably assembled with said wand means formed with a guide slot having slot surfaces engaged by the insulation material bracket for guiding said nozzle tip during movement of the wand means.